Aug. 9, 1966 E. A. KNOWLTON 3,264,699
SEALED FASTENING DEVICE
Filed March 2, 1964
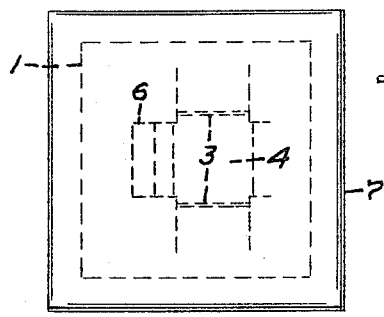
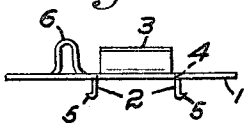
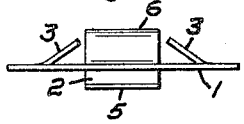
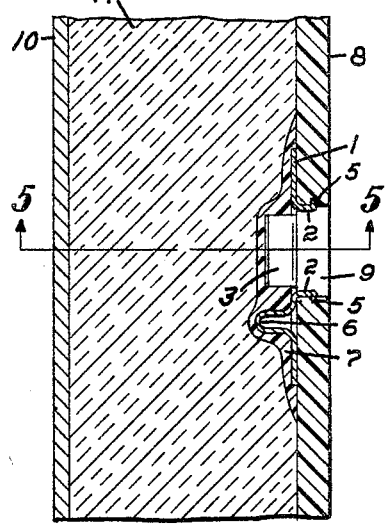
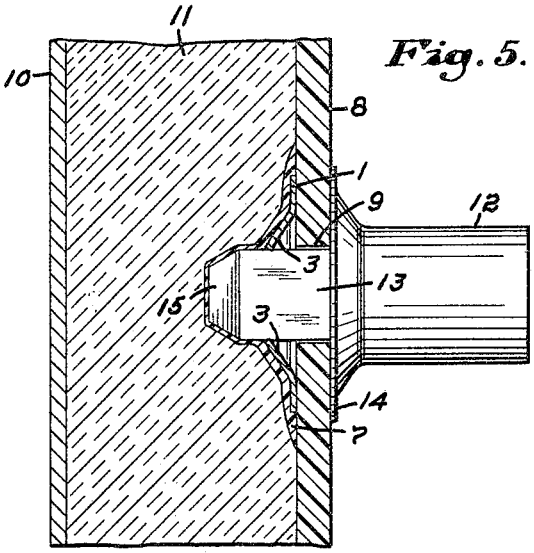
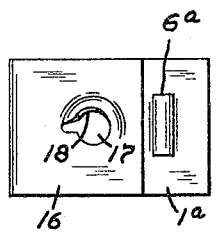
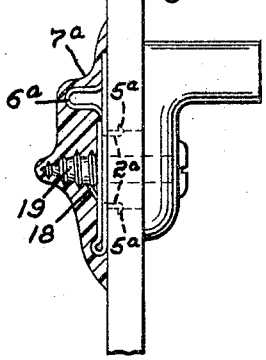
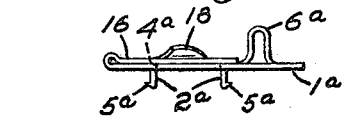
Inventor:
Edward A. Knowlton,
by Philip E. Parker
Atty.

United States Patent Office 3,264,699
Patented August 9, 1966

3,264,699
SEALED FASTENING DEVICE
Edward A. Knowlton, Winchester, Mass., assignor to United-Carr Incorporated, a corporation of Delaware
Filed Mar. 2, 1964, Ser. No. 348,609
5 Claims. (Cl. 24—73)

This invention relates generally to fasteners and in particular to a fastener for attaching a shelf support to the interior liner of a refrigerator, freezer, cold storage box or similar appliance. The fastener, while it is perfectly suitable for use with a metal liner, is seen to represent a substantial improvement in shelf support installations wherein the internal liner of the box is made of a plastic material.

In recent years many manufacturers of refrigerators have begun to replace the metal interior liners of their models with liners made of molded plastic. Likewise, they have continued to employ, or in some instances recently adopted, a method of insulating the boxes, generally known in the trade as the "poured-in-place" method of installing insulation.

Briefly, the latter is accomplished by placing the interior plastic liner inside the metal frame of the box so that there is a space or void between the corresponding surfaces of the two, and then injecting the well-known foam plastic urethane which expands to fill the void between the frame and liner. The separate chemical components which react to form urethane are poured in liquid form into an agitator and injected by a nozzle into the void as soon as the urethane begins to foam and expand. In its expanded state the urethane assumes a rigid or semirigid form, depending on the make-up and relative proportions of the components which are combined to bring about the reaction. During this process the box must be sealed from the outside except for the opening necessary to inject the urethane foam into the space between the frame and the liner. Further, it is quite obvious that once the insulation is in place the outside surface of the interior liner becomes unavailable.

It is also significant to note that during the time the urethane is foaming substantial pressure is exterted on all surfaces of the liner. Thus, it has been the practice to insert a solid bracing plug inside the box to support the liner at all surfaces during the pouring operation. It is desirable that each surface of the plug be in abutting relation to the corresponding surface of the liner to prevent any buckling or warping.

The use of the plastic liner and "poured-in-place" insulation has created certain problems with respect to the methods used to install shelf supports, ornamental devices, or any other part which will project into the interior of the box. Specifically, some of these problems are as follows:

(1) It is extremely undesirable to have any projection inside the liner which would interfere with the insertion or the functioning of the bracing plug discussed above. Thus, supports, etc., cannot be installed prior to the pouring of the foam insulation.

(2) Since the outside of the liner becomes unavailable subsequent to the pouring of the insulation, some type of "blind" fastener must be employed.

(3) Where apertures to accommodate fasteners, shelf supports, ornaments, etc., are precut in the liner prior to installation, some means must be employed to prevent the urethane foam from escaping through these apertures during expansion.

(4) The thickness of molded plastic liners usually varies considerably in different areas. Hence, a fastener which is adapted to be secured to any area of the liner regardless of such variations is desirable.

(5) Plastic liners are likely to split, crack, or deform when a substantial load is exerted on a relatively small support-bearing area, hence, the need for a shelf support and fastener to secure same which will distribute the load over a comparatively large area of the liner.

The present invention was designed with an eye to the solution of these problems. Thus, an object of the invention is to provide a fastener and shelf support combination which will allow for blind attachment of the shelf support subsequent to the pouring of insulation.

Another object of the invention is to provide a fastener which is adapted to overcome wide variations in the thickness of the walls of a liner on which it is to be installed.

A further object of the invention is to provide a fastener and shelf support combination which will effectively distribute the load on the support over a relatively large bearing area of a liner.

A further object is to provide a combination fastener and sealer which will effectively prevent insulation from entering the interior of the refrigerator box in applications wherein a "poured-in-place" type of insulation is employed.

Further advantages provided by the invention will become evident from a reading of the following detailed description in conjunction with a viewing of the accompanying drawings in which:

FIG. 1 is a top plan view of the fastener and sealer;
FIG. 2 is a side elevation of the fastener without the sealer;
FIG. 3 is a front view of the fastener without the sealer;
FIG. 4 is a side elevation partly in section of the fastener with sealer attached to a liner;
FIG. 5 is a section taken on line 5—5 of FIG. 4 showing a shelf support secured to a liner by the fastener;
FIG. 6 is a top plan view of an alternative construction of the fastener;
FIG. 7 is a side elevation of the fastener shown in FIG. 6; and
FIG. 8 is a side elevation of the alternative construction of the fastener shown in FIGS. 6 and 7 securing a shelf support to a liner with the sealer shown in section.

Referring now to the drawings, and in particular to FIGS. 1, 2, and 3 wherein the fastener is shown to be of unitary metal construction. This construction is obtained by shearing portions of a relatively thin metal piece and thence bending the portions outlined by the shear out of the original plane of the metal piece to form the various functional parts of the fastener.

In this instance, the functional parts include a base portion 1, a pair of spring arms 2, and a pair of upstanding legs 3, disposed at acute angles to the base 1, all of which co-operate to form the outer limits of a central aperture 4 in the fastener. Each of the spring arms 2 terminates in a free end having a sharp burred portion 5 and one of the said arms has a loop 6 in the form of an inverted U between its free end and its connection with the base 1. This arm is the more flexible of the two, the other being relatively rigid by comparison.

As shown in FIG. 1 a plastisol sealer 7 fully overlies one surface of the base 1, the loop portion 6 and the upstanding legs 3; and forms a closure of the aperture 4 at one entrance thereto. The sealer also extends outwardly beyond the limits of the base 1.

FIGS. 4 and 5 depict the fastener with sealer installed at the outside surface of a plastic refrigerator liner 8 having an aperture 9 cut therein. The aperture 9 is substantially square and has a length somewhat less than the distance between the sharp burred portions 5, as shown in FIG. 2.

To secure the fastener to the liner the more rigid of the spring arms 2 is first engaged with one of the walls defining the aperture 9. The loop portion 6 of the other spring arm is then depressed, causing an expansion of the loop, which in turn decreases the distance between the spring arms 2 and allows the second arm to snap into engagement with an opposite wall defining the aperture 9. The burred portions 5 of each of the arms are thus placed in biting engagement with the liner 8, and the under surface of the base 1 is flush with a substantial area of the surface of the liner 8.

FIGS. 4 and 5 further represent a portion of a refrigerator box having an outside metal frame 10 and urethane foam insulation 11 disposed between the frame 10 and the liner 8 which has been poured in place by the method previously described. The fastener with sealer was secured to the liner 8 prior to the pouring. The sealer effectively prohibited the foam insulation 11 from escaping through the aperture 9.

Moreover as is readily seen, the fastener does not project beyond the internal surface of the liner and hence presents no obstruction to the insertion and functioning of a bracing plug.

It is likewise evident that the fastener is adapted to be secured at any part of the liner regardless of thickness variations, since the spring arms need not pass through the aperture 9, but rather bite into the walls of the liner defining same.

FIG. 5 depicts the fastener as it is used to secure a shelf support to the liner 8. The shelf support is of one-piece molded plastic construction and is best described as a cylindrical load supporting portion 12 and an attaching shank 13 extending in opposite directions from a web-like, circular flange 14. The attaching shank 13 has a tapered leading end 15 for guiding the shank into the aperture 9 in the liner and the aperture 4 in the fastener.

As the shank 13 is inserted, the tapered end leads the shank between the spring arms 2 and the upstanding legs 3. The nontapered portion of the shank further impresses the burred ends 5 of the arms 2 into the liner until the shank is fully seated. The legs 3 grip and bite into the shank 13 and by a ratchet-like action secure the shank to the liner.

The web-like flange 14 is compressed against the surface of the liner 8 surrounding the aperture 9 in the manner of a suction cup to prevent moisture or other foreign matter which might adversely affect the insulation from passing through the aperture 9.

It should likewise be noted that the sealer 7 is bulged by the shank 13, but due to the blunt end construction is not ruptured and continues to prevent any contact between the insulation and the support.

The reader will also note that as previously stated any load subsequently placed on the shelf support will be distributed over a relatively large bearing area of the liner.

FIGS. 6, 7, and 8 depict an alternative construction of the invention wherein the upstanding legs 3 have been eliminated. In lieu thereof a portion of the metal plate has been bent back on itself to present an upper plate 16 superimposed on the base 1a.

The central aperture 17 of the upper plate 16, which is coincident with the aperture 4a in the base, has a thread impression 18 formed on its periphery. The alternate construction is thereby adapted to accommodate a shelf support of the variety shown in FIG. 8 which is attached, using a sheet metal screw 19.

The load distributing characteristic of the fastener is particularly evident in this construction wherein the screw 19 is in effect isolated from any contact with the liner 8a.

In this instance, if desired, a spreading tool (not shown) may be used to force the burred ends 5a of the spring arms into biting engagement with the liner 8a.

With reference to the foregoing description it is to be understood that what has been disclosed therein represents only two embodiments of the invention and is to be construed as illustrative rather than restrictive or limiting in nature and that the scope of the invention is best described by the following claims.

I claim:
1. A fastening device for securing a part to a thin, frangible, apertured support comprising a thin, planar, apertured base plate, the aperture in said base plate being adapted to receive a part to be secured to the support and said base plate being adapted to overlie an external surface of the support adjacent the aperture therein to provide for even load distribution over a relatively large surface area of the support; a plurality of spring fingers for engaging portions of the support adjacent the aperture therein, disposed adjacent the aperture in said base plate, and extending away from one side of said base plate, and means for engaging a part to be secured to said support disposed adjacent the aperture in said base plate at the side of said base plate opposite that from which said spring fingers extend.

2. A fastening device comprising a thin, planar base plate having an aperture therein, said aperture being adapted to receive a part to be secured to an apertured workpiece, a plurality of spring fingers for attaching said device to an apertured workpiece disposed adjacent said aperture and extending away from one side of said base plate, at least one of said spring fingers being connected to said base plate through a loop portion extending outwardly from the side of said base plate opposite that from which said spring fingers extend, said one spring finger being movable toward the other of said spring fingers responsive to a force applied to said loop portion in a direction toward said base plate, and means for engaging a part to be fastened disposed adjacent said aperture at the side of said base plate from which said loop portion extends.

3. A fastening device comprising a base plate having an aperture therein, said aperture being adapted to receive a part to be secured to an apertured workpiece, a plurality of spring fingers for attaching said device to an apertured workpiece disposed adjacent said aperture and extending away from one side of said base plate, means for engaging a part to be secured by said device disposed adjacent said aperture at the side of said base plate opposite that from which said spring fingers extend, and a sealer overlying one side of said base plate and said means and said aperture, said sealer being stretchable and expansible away from said device responsive to the insertion of a part to be fastened into said aperture whereby the member is engaged by said means and said aperture remains sealed.

4. A fastening device for securing a part to an apertured support comprising an apertured base plate, the aperture in said base plate being adapted to receive a part to be secured to the support and said base plate being adapted to overlie a surface of the support adjacent the aperture therein to provide for even load distribution over a relatively large surface area of the support, a plurality of spring fingers for engaging the support adjacent the aperture therein disposed adjacent the aperture in said base plate and extending away from one side of said base, and a second plate joined to and overlying portions of said base plate, said second plate having an aperture therein located adjacent the aperture in said base plate and having thread means formed on its periphery, said thread means being adapted to engage a cooperating fastener member for securing a part to the support.

5. An assembly comprising in combination a thin, frangible support having internal walls defining an aperture therein and a fastener anchored to said support adjacent an external surface thereof by a plurality of opposed spring fingers in biting engagement with portions of said walls defining said aperture, said fastener including a thin, planar, apertured base plate said aperture being adapted to receive a part to be affixed to said support, said base plate overlying a relatively wide surface area of said support adjacent the aperture therein, said spring fingers extending normally from the side of said base plate adjacent said support, and means disposed adjacent the aperture in said base plate at the side of said base remote from said support for blindly engaging a part to be affixed to the support.

References Cited by the Examiner
UNITED STATES PATENTS

| | | | |
|---|---|---|---|
| 2,102,999 | 12/1937 | De Vries | 85—84 |
| 2,244,978 | 6/1941 | Tinnerman | 85—36 |
| 2,271,469 | 1/1942 | Wilson | 248—239 |
| 2,574,330 | 11/1951 | Judd | 287—53 |
| 2,823,572 | 2/1958 | Gisondi | 85—85 |
| 2,839,350 | 6/1958 | Hill et al. | 248—243 X |
| 2,948,938 | 8/1960 | Holton | 24—73 |

FOREIGN PATENTS

| | | |
|---|---|---|
| 645,876 | 7/1928 | France. |
| 1,091,680 | 11/1954 | France. |

WILLIAM FELDMAN, *Primary Examiner.*

DONLEY J. STOCKING, *Examiner.*

E. SIMONSEN, *Assistant Examiner.*